(12) United States Patent
Posamentier

(10) Patent No.: US 7,446,660 B2
(45) Date of Patent: Nov. 4, 2008

(54) PASSIVE ENVIRONMENTAL RFID TRANSCEIVER

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 11/387,160

(22) Filed: Mar. 22, 2006

(65) Prior Publication Data

US 2007/0222590 A1 Sep. 27, 2007

(51) Int. Cl.
*G08B 13/14* (2006.01)

(52) U.S. Cl. .................. 340/572.1; 340/10.41; 340/447

(58) Field of Classification Search .............. 340/572.1, 340/447, 448, 10.41, 870.16, 870.17, 539.22, 340/539.26, 539.27, 539.28; 455/41.1, 41.2
See application file for complete search history.

(56) References Cited

U.S. PATENT DOCUMENTS

| | | | | |
|---|---|---|---|---|
| 5,652,382 | A * | 7/1997 | Nakagawa et al. | 73/29.02 |
| 5,757,195 | A * | 5/1998 | Bird | 324/678 |
| 6,362,737 | B1 * | 3/2002 | Rodgers et al. | 340/572.1 |
| 6,677,859 | B1 * | 1/2004 | Bensen | 340/572.1 |
| 6,812,839 | B1 * | 11/2004 | Belcher et al. | 340/572.1 |
| 6,847,912 | B2 * | 1/2005 | Forster | 340/10.1 |
| 6,927,687 | B2 * | 8/2005 | Carrender | 340/10.1 |
| 7,005,987 | B2 * | 2/2006 | Sinnett et al. | 340/572.1 |
| 7,026,941 | B1 * | 4/2006 | Anderson | 340/573.1 |
| 7,091,840 | B2 * | 8/2006 | Ichinose | 340/447 |
| 7,117,374 | B2 * | 10/2006 | Hill et al. | 340/572.1 |
| 7,209,032 | B2 * | 4/2007 | Fennel et al. | 340/447 |
| 2003/0102984 | A1 * | 6/2003 | Elsner et al. | 340/870.16 |

OTHER PUBLICATIONS

U.S. Appl. No. 10/997,595, filed Nov. 24, 2004—YARVIS—Sensor Devices with RFID Communications.

* cited by examiner

*Primary Examiner*—John A Tweel, Jr.
(74) *Attorney, Agent, or Firm*—John F. Travis

(57) ABSTRACT

Some embodiments of the invention may incorporate an oscillator circuit into a radio frequency identification (RFID) tag in which the oscillator circuit comprises at least one component that is sensitive to an environmental factor such as temperature or humidity. When the tag responds to an RFID reader, the tag may incorporate the sense environmental parameter into its response by transmitting an oscillating signal whose frequency indicates the value of the parameter. The RFID reader may then determine the parameter by analyzing the resulting analog portion of the waveform in terms of frequency and/or cycle and/or pulse width. In some embodiments, the environmental sensor may be incorporated into the integrated circuit containing the RFID tag circuit.

23 Claims, 5 Drawing Sheets

PASSIVE ENVIRONMENTAL RFID TRANSCEIVER

BACKGROUND

Environmental sensors may be used to measure temperature, humidity, etc. and report the results to a data collection device. It is possible to attach a radio device to a sensor so that the results can be reported wirelessly. However, both the sensor and the radio may require power source, such as a battery. This can increase both the manufacturing cost of the sensor and the lifetime maintenance cost of the sensor, so that the sensor becomes economically unfeasible for many applications. In addition, most radio circuits, by themselves may cost enough to make the sensor device economically infeasible, thus forcing users to rely on hardwired connections, which are in turn infeasible for applications requiring mobility.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
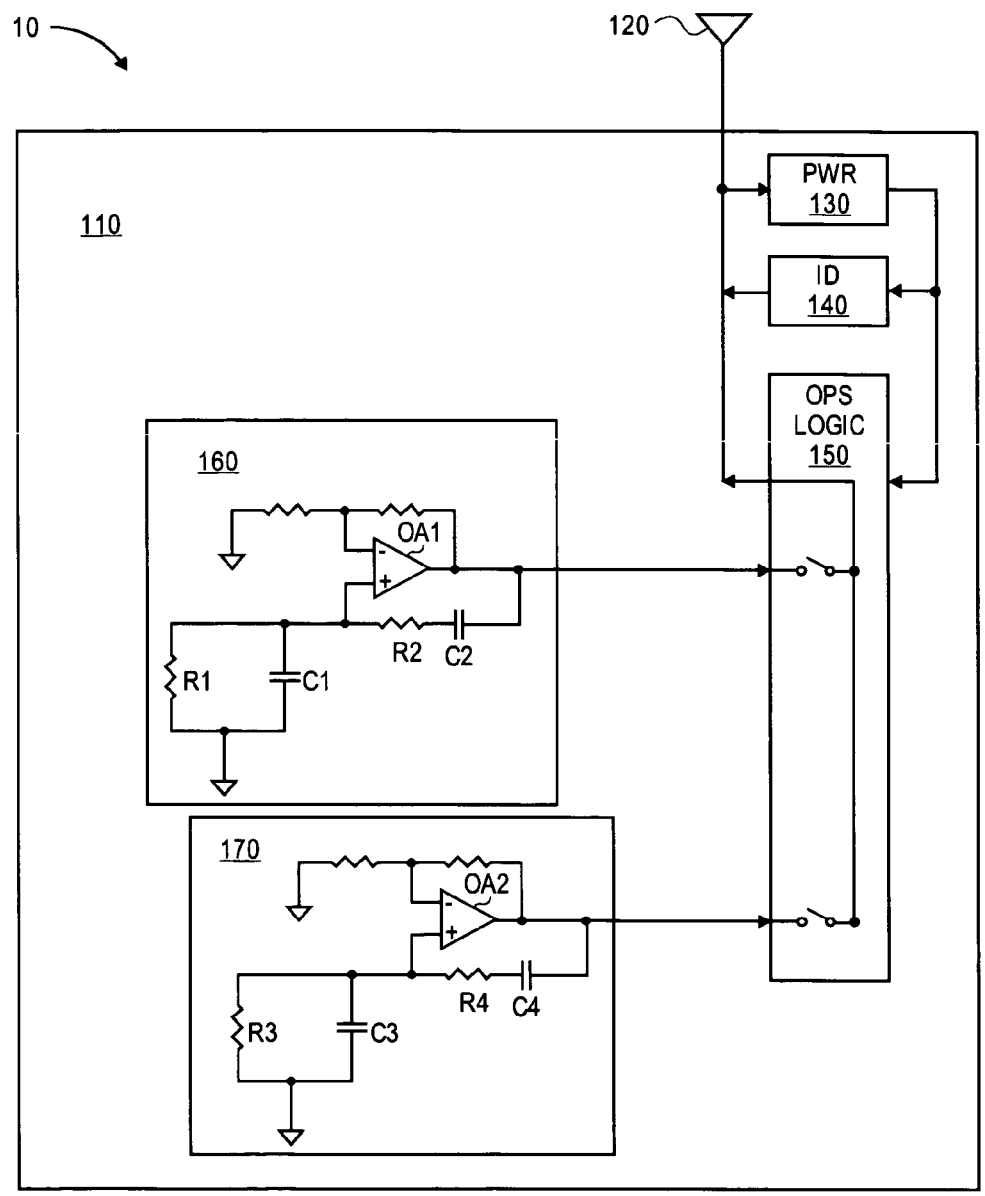
FIG. 1 shows a block diagram of an RFID tag, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "wireless" may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

Within the context of this document, an RFID tag may be defined as comprising an RFID antenna to receive an incoming wireless signal that serves to activate the RFID tag and to transmit a wireless response in the form of a modulated radio frequency signal, and an RFID tag circuit, which may include, but is not limited to: 1) circuitry to harvest (i.e. collect and store) received energy from the incoming radio frequency signal and use some of that energy to power the operations of the RFID tag circuit, 2) circuitry to store an identification code for the RFID tag, and 3) circuitry to perform operational logic functions, such as switching, shifting, comparing, etc. As is known in the field of RFID technology, "transmitting" a signal from an RFID tag may include either: 1) providing sufficient power to the antenna to generate a signal that radiates out from the antenna, or 2) reflecting a modulated version of the received signal. A 'passive' RFID tag or RFID tag circuit is one that uses energy harvested from a received wireless signal to power its own circuitry, rather than using a battery or hardwired power supply for that electrical power. Within the context of this document, an RFID reader may be a device that wirelessly transmits a signal to the RFID tag to cause the RFID tag to wirelessly transmit the aforementioned response, which may be received by the RFID reader to identify the RFID tag.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Some embodiments of the invention may incorporate an oscillator circuit in a passive RFID tag circuit, in which a component of the oscillator circuit is sensitive to an environmental factor (e.g., temperature, humidity, etc.) in a way that affects the frequency of the oscillator circuit's output. When the RFID tag is prompted to respond to an RFID reader, that response may include a portion in which the oscillator circuit's output is encoded into the signal. When this oscillating signal is decoded by the RFID reader, the frequency of that signal may be used to determine the value of the environmental factor that was sensed at the RFID tag. Thus, the complicated and power hungry operations needed to covert a simple oscillator output into a meaningful parameter may be performed by the RFID reader, which may have plenty of electrical power and processing capability, rather than by the RFID tag, which may have very little of either.

FIG. 1 shows a block diagram of an RFID tag, according to an embodiment of the invention. In the illustrated embodiment, RFID tag 10 may include antenna 120 and RFID tag circuit 110. RFID tag circuit 110 may include power circuit 130 to harvest electrical power from wireless signals received through antenna 120, identification circuit 140 to hold the tag's identification code (sometimes called the tag's serial number), and operational logic 150 to control the operations of the RFID tag circuit.

RFID tag circuit 110 may also include one or more oscillator circuits (two are shown, labeled 160 and 170, although any feasible number may be used), whose outputs are sent to operational logic 150 as analog signals to be transmitted through antenna 120. Each oscillator circuit may be used in an environmental sensor, with an oscillating output signal whose frequency is an indication of a particular sensed environmental factor. For example, in the oscillator circuits shown (which are shown for example only—other embodiments may use other oscillator circuits), the output frequency may generally be proportional to the inverse of $2\pi RC$, so that if the value of three of the four R and C components is known (e.g., R1, R2, C1, and C2 in oscillator circuit 160), a determination of the output frequency may allow the variable value of the fourth component to be determined. If the value of that fourth component changes in a known manner based on a particular environmental factor, the value of that environmental factor may be determined.

For example, in oscillator circuit 160, resistor R1 or R2 may be a resistive device whose resistance changes in a measurable and predictable manner based on its temperature. One example would be a thermistor with a negative temperature coefficient, but other embodiments may use other techniques. Such a temperature-sensitive resistive device may also be placed in series or in parallel with a standard resistor at the R1 or R2 position to affect the degree of overall resistive change. With this circuit configuration, the output of the oscillator, i.e., the signal at the output of op amp 1 (OA1), may be an oscillating signal (such as a sine wave) whose frequency is a direct indicator of the temperature of the temperature sensitive resistive component.

In another example, in oscillator circuit 170 components OA2, R3, R4, C3, and C4 may correspond with OA1, R1, R2, C1, and C2, respectively, of oscillator circuit 160. However, in oscillator circuit 170 capacitor C3 or C4 may be a capacitive hygrometer, i.e., a capacitor whose capacitance value is sensitive to humidity. An example would be a thin film polymer dielectric exposed to ambient air. The ambient humidity may migrate into the polymer and affect its dielectric constant, thus affecting the value of the capacitor. In a similar manner to that described above, the frequency of the oscillator's output would then indicate the humidity level at the RFID tag. The output of both oscillator circuits 160 and 170 may be individually switched to the antenna at the proper time by operational logic 150, so that each value may be individually reported via a transmission from the RFID tag 110.

Figure 2:
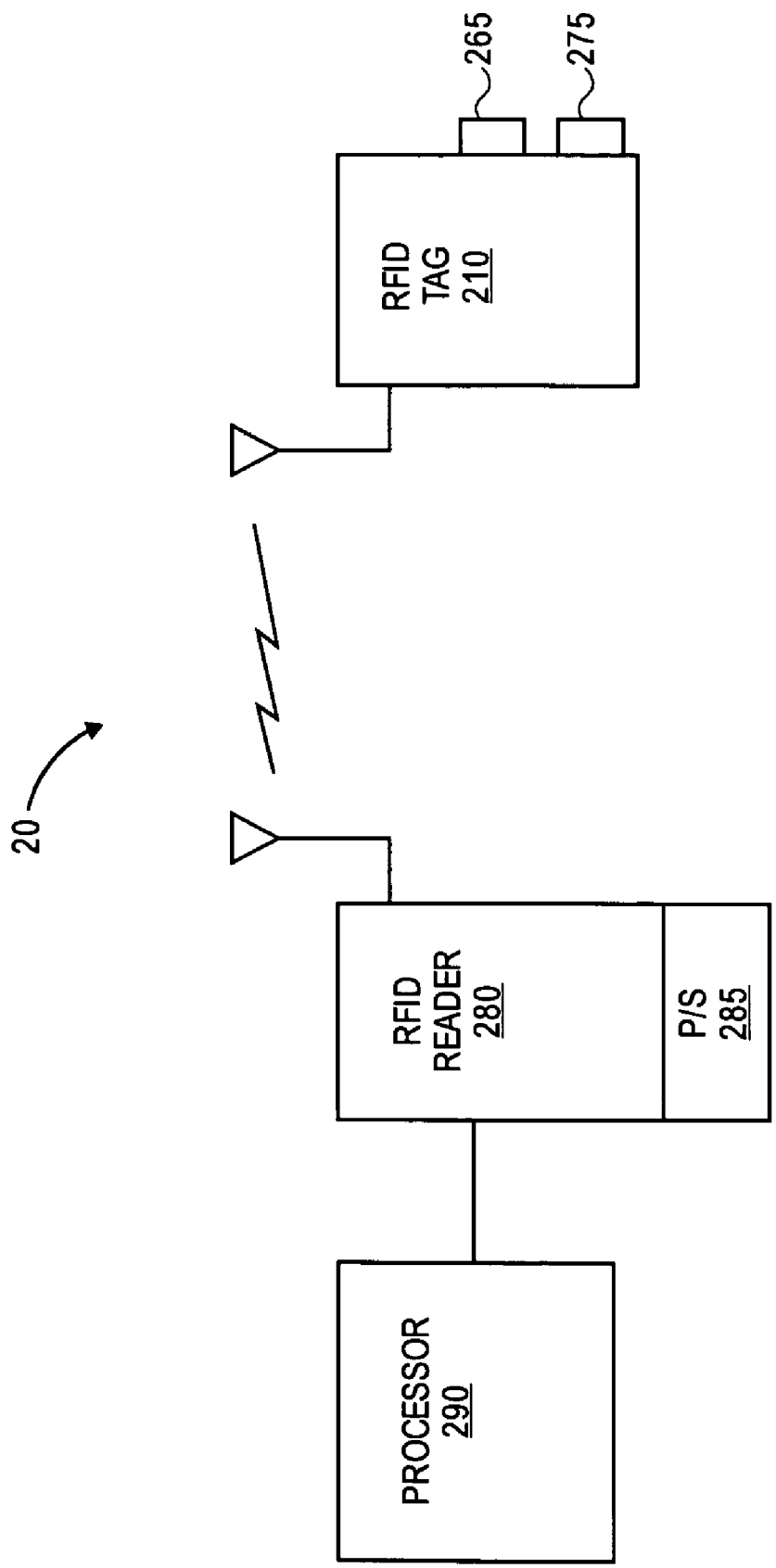
FIG. 2 shows a system including an RFID reader and an RFID tag, according to an embodiment of the invention.

FIG. 2 shows an RFID reader/RFID tag system, according to an embodiment of the invention. In system 20, RFID tag 210 may have the general overall configuration shown in FIG. 1, including two environmentally-sensitive components 265 and 275. In one embodiment, for example, component 265 may be a thermistor for sensing temperature, while component 275 may be a capacitive hygrometer for sensing humidity, each connected into their own separate oscillator circuit. In other embodiments, the RFID tag may have any feasible number of sensor components, and each component may be used to sense any feasible environment factor, so long as that component may be used to affect the frequency of an oscillator circuit. Examples may include, but are not limited to, such things as: 1) light level (e.g., a PIN diode, photo diode, or photo-resistor), 2) other sensors of electromagnetic radiation outside the visible light spectrum (e.g., infrared sensor), 3) mechanical stress (e.g., a resistive strain gauge), 4) submersion (e.g., a liquid-saturation version of the capacitive hygrometer, or a resistor connected into the circuit through immersion in a conductive liquid), 5) the aforementioned temperature and/or humidity, 6) etc. In some embodiments the environmentally-sensitive component may be formed in the same integrated circuit that contains the RFID tag circuit, resulting in a monolithic RFID tag circuit with integrated sensor. In other embodiments, the component may be external to, but attached to, the integrated circuit containing the RFID tag circuit (e.g., as implied in FIG. 2). In still other embodiments the component may be physically separate from, but electrically connected to, the RFID tag integrated circuit. Other embodiments may be hybrids, with multiple different components connected in two or more of these ways.

RFID reader 280 may wirelessly communicate with the RFID tag 210. Information received from RFID tag 210 by RFID reader 280 may be processed in any feasible manner. Some processing may take place in RFID reader 280, but other processing may take place in a separate processor 290, which may communicate with the RFID reader over any feasible communications link. For example, in some embodiments the RFID reader may determine the frequency of the oscillator(s) in RFID tag 210, but pass that information on to processor 290 to determine what environmental values are indicated by those frequencies. In other embodiments, the RFID reader may determine the environmental values. Both the RFID tag 210 and the RFID reader 280 may include one or more antennas, which may be of any feasible type, such as a dipole antenna. The RFID reader may also include a power supply 285. In some embodiments it may be a portable power supply such as a battery.

Figure 3:
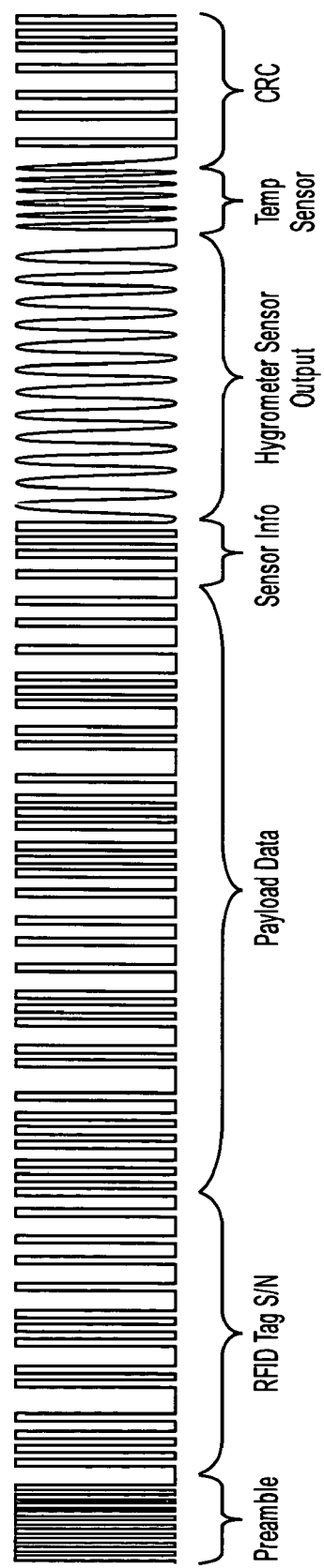
FIG. 3 shows a format of a transmission from an RFID tag, according to an embodiment of the invention.

FIG. 3 shows a format of a transmission from an RFID tag, according to an embodiment of the invention. Although an actual transmission may contain the illustrated signal modulated onto a radio frequency carrier wave by the RFID tag, the carrier wave has been omitted from the figures for clarity of illustration. In the illustrated embodiment, a preamble may be transmitted first, to allow the receiving RFID reader to synchronize on the signal. Following that may be the RFID tag's identification number, sometimes called its serial number, which allows the RFID reader to determine which RFID tag is transmitting the data. In some embodiments, that may be followed by a so-called payload, which may be any data not otherwise described here that the RFID tag is designed to transmit. The payload may comprise any feasible data, such as but not limited to: 1) other data collected and/or stored in the RFID tag, 2) an indicator of received signal strength, 3) the length of the current transmission, 4) etc.

Some embodiments may include a section labeled here as Sensor Info. This may contain various preliminary data about the environmental information that is being transmitted, such as but not limited to: 1) whether any environmental data is to follow, 2) if so, the nature of the environmental data (e.g., temperature, humidity, etc.), 3) a conversion factor to convert frequency into specific environmental units (e.g., degrees Celsius, percent relative humidity, etc.), 4) how many separate environmental factors are included in the transmission, 5) how long each environmental factor will be transmitted, 6) etc. FIG. 3 shows a portion in which the signal indicates humidity, followed by another portion in which the signal indicates temperature. These sensor outputs may then be followed by a cyclic redundancy check (CRC), or other error detection indicator which can be used to verify the transmission was not received in a corrupted form, and if it was, may possibly be used to correct the data without requiring retransmission. Although the embodiment of FIG. 3 shows certain elements of the transmission in a certain order, other embodiments may have more, fewer, or different elements, and may arrange them in a different order.

Most of the elements of the transmission of FIG. 3 are shown as digital signals (i.e., two levels to represent 1's and 0's respectively, with sharp transitions between each level). By contrast, the sensor outputs are shown as analog signals, with the general shape of a sine wave, although other shapes may conceivable be used (e.g., a truncated sine wave could appear much like a digital signal, or alternately (depending on the truncation or clipping) could be observed to be a pulse-width-modulated signal). The difference between the digital data and analog data, however, may be primarily in the way the signals are processed in the RFID reader. While the digital data assumes that each bit persists for a certain period of time, and the level of each bit may indicate its value of 1 or 0, the important element of the analog data may be its frequency and/or duty cycle. Various methods may be used to determine the frequency, such as converting the analog signal to digital data and performing a Fast Fourier Transform or Discrete Fourier transform on it in a digital signal processor, although other techniques may also be used. The difference in processing techniques between the analog data from the sensors and the digital data of the remaining transmission makes it important to know when the analog signals begin and end. One technique may be the aforementioned Sensor Info portion of the transmission, which may serve as both an indication that analog data follows, and an indication of how long it will last. In the example of FIG. 3, more digital data (the CRC) follows the analog data, so that the RFID reader must know when to switch back to digital processing, but other embodiments may differ. For example, in some embodiments the CRC may immediately follow the sensor info, while the remaining part of the transmission may be assumed to be all analog, and the transmission may be over when the RFID tag stops transmitting (e.g., when it stops modulating the reflected signal).

Figure 4:
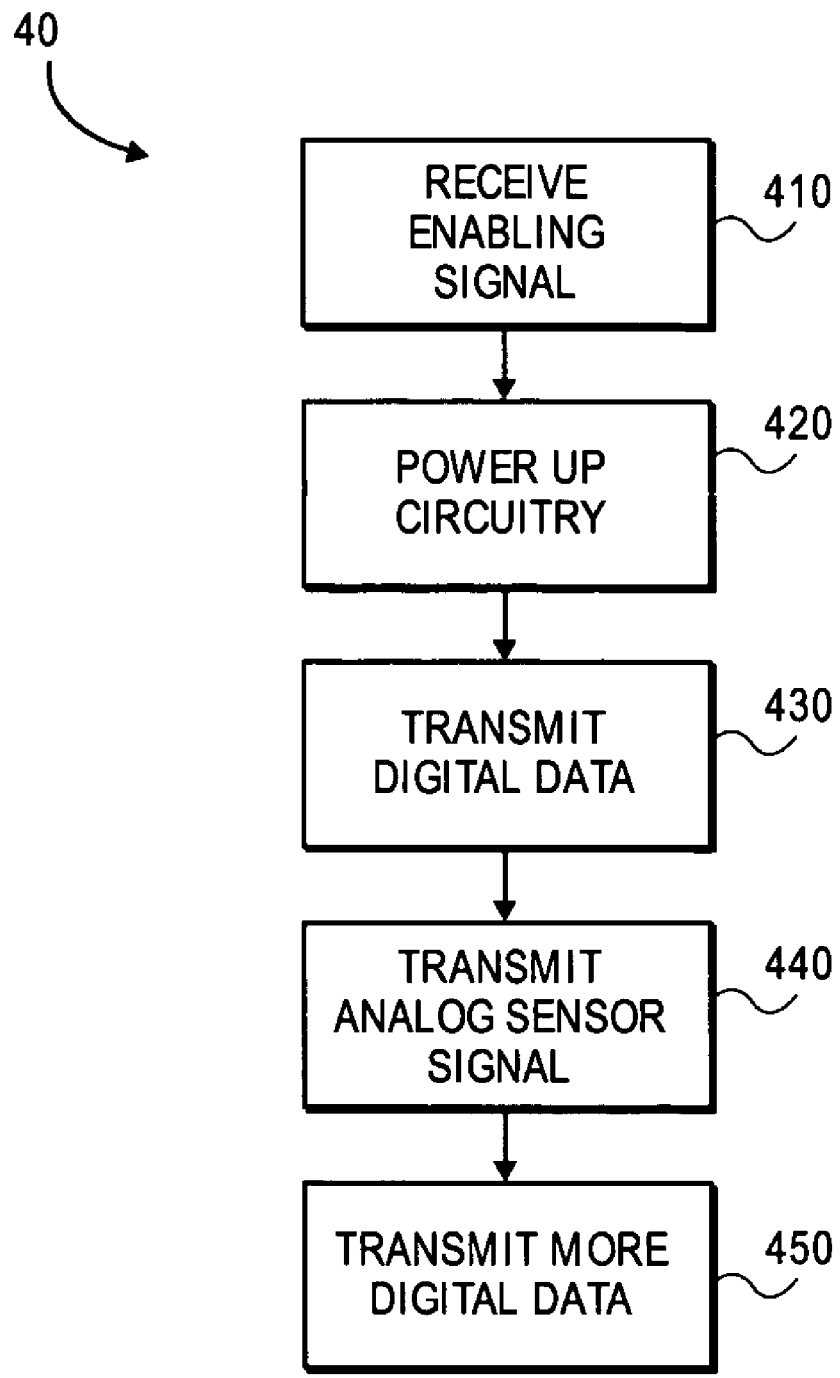
FIG. 4 shows a flow diagram of a method performed by an RFID tag, according to an embodiment of the invention.

FIG. 4 shows a flow diagram of a method performed by an RFID tag, according to an embodiment of the invention. In flow diagram 40, at 410 the RFID tag may receive an enabling signal. In some embodiments, an enabling signal may be a signal with the right frequency to be detected by the RFID tag and with sufficient signal strength to provide enough electrical power to power up the RFID tag circuitry as indicated at 420. In other embodiments, an enabling signal may also contain address information and/or other data that indicates this particular RFID tag is to respond. At 430, the RFID tag may begin its response by transmitting its digital data. If there is also analog data to be transmitted, the RFID tag may then transmit that analog data at 440. If there is more digital data to be transmitted, the RFID tag may then transmit that digital data at 450. In some embodiments, the digital and analog data may be similar to that previously described for FIG. 3.

Figure 5:
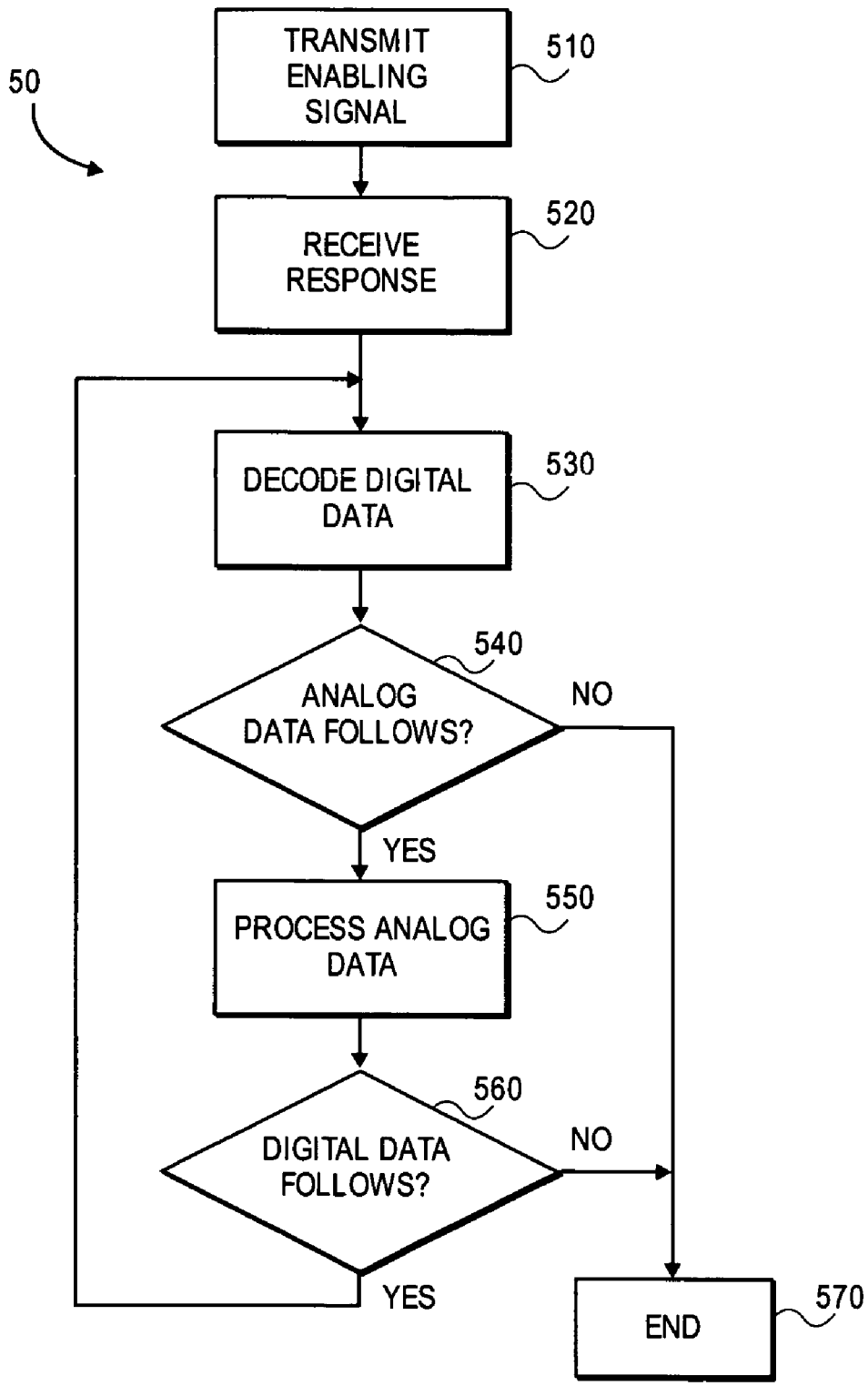
FIG. 5 shows a flow diagram of a method performed by an RFID reader, according to an embodiment of the invention.

FIG. 5 shows a flow diagram of a method performed by an RFID reader, according to an embodiment of the invention. In flow diagram 50, at 510 the RFID reader may transmit an enabling signal to an RFID tag. The enabling signal may meet the criteria described earlier in the description of FIG. 4. At 520 the RFID reader may receive a response transmitted by the RFID tag. In some embodiments the beginning of the response may include a preamble (as indicated in FIG. 3) to allow the RFID reader to synchronize on the response. At 530 a digitally-encoded portion of the response may be decoded to produce the sequence of 1's and 0's that may represent such things as the RFID tag identification code, payload data, etc. It may be determined at 540 if analog-encoded data (e.g., a sine wave whose frequency represents a value) also follows in the transmission. If not, in some embodiments the transmission may end as shown at 570, but in other embodiments, more digitally-encoded data may follow and continue to be decoded (not shown). If it is determined that analog-encoded data follows, the RFID reader may switch to an analog-processing mode and process the analog data accordingly at 550. When the analog data is ended, it may be determined at 560 if more digital data follows. If so, processing may return to 530 to decode the digital data. If not, processing may end at 570.

By including indicators that indicate when to switch from digital to analog processing and from analog to digital processing, the analog sections may be included in the transmission at various points, and may be intermixed with the digital sections in various ways. These indicators may be implemented in various ways, such as but not limited to:

1) A 'sensor info' portion in the digital section may indicate that analog data follows. This portion may also give more specific information about the analog section, such as but not limited to one or more of the following: how long the analog section will last, how many different analog values are sequentially encoded in the analog section and how long each will last, some scaling data to allow accurate conversion of frequency to specific environmental parameters, and/or whether to switch back to digital processing at the end of the specified analog time period.
2) A particular analog indicator (e.g., a frequency unused by the RFID tags) may indicate switching back to digital processing.
3) The specifics of digital/analog changeover may be fixed in a pre-determined format, so that such information does not need to be transmitted from the RFID tag.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus, comprising
a passive radio frequency identification (RFID) tag circuit comprising an oscillator circuit having a component sensitive to an environmental factor, wherein a frequency of a signal output by the oscillator circuit is indicative of a value of the environmental factor;
wherein a transmission from the RFID tag circuit comprises a first section modulated with an identification code of the RFID tag circuit and a second section modulated with the signal output by the oscillator circuit.

2. The apparatus of claim 1, wherein the identification code is encoded as a digital value and the output of the oscillator circuit is encoded as an oscillating analog signal.

3. The apparatus of claim 1, wherein the second section includes a first portion indicating a value of the environmental factor and a second portion indicating a value of a second environmental factor.

4. The apparatus of claim 1, wherein the component is a thermistor.

5. The apparatus of claim 1, wherein the component is a capacitive hygrometer.

6. The apparatus of claim 1, further comprising a dipole antenna coupled to the RFID tag circuit.

7. The apparatus of claim 1, wherein at least a part of the oscillator circuit is in a same integrated circuit as the RFID tag circuit.

8. The apparatus of claim 1, wherein all of the oscillator circuit is in a same integrated circuit as the RFID tag circuit.

9. An apparatus, comprising
a radio frequency identification (RFID) reader device configured to:
receive a wireless response from a passive RFID tag;
demodulate a first section of the response to determine an identification code for the RFID tag; and
demodulate a second section of the response to determine a first value of a first environmental factor sensed by the RFID tag, wherein the first value is based on at least one parameter selected from a list consisting of a frequency of an oscillating signal derived from the demodulated second section and a pulse width determination of the oscillating signal derived from the demodulated second section.

10. The apparatus of claim 9, wherein the RFID reader device is further to demodulate a third section of the response to determine a second value of a second environmental factor sensed by the RFID tag, wherein the second value is based on a signal derived from the demodulated third section.

11. The apparatus of claim 9, wherein the RFID reader device further comprises an element selected from a list consisting of a dipole antenna and a battery.

12. A method, comprising:
sensing an environmental parameter;
producing an oscillating signal whose frequency is indicative of a value of the sensed environmental parameter; and
transmitting a wireless signal from a radio frequency identification (RFID) tag, a first section of the signal modulated with an identification code for the RFID tag and a second section of the signal modulated with the oscillating signal;
wherein said producing takes place within the RFID tag.

13. The method of claim 12, further comprising harvesting electrical power from a received wireless signal to power circuitry of the RFID tag.

14. The method of claim 12, wherein said modulating the first section of the signal comprises modulating the signal with a digital waveform and said modulating the second section of the signal comprises modulating the signal with an oscillating waveform.

15. The method of claim 12, wherein said sensing an environmental parameter comprises at least one of sensing temperature and sensing humidity.

16. A method, comprising: receiving a wireless response from a radio frequency identification (RFID) tag, the response including a first section modulated with an identification code of the RFID tag and a second section modulated with an oscillating signal whose frequency indicates a value of an environmental factor.

17. The method of claim 16, further comprising demodulating the second section to reproduce the oscillating signal.

18. The method of claim 17, wherein said demodulating the second section comprises digitizing the oscillating signal and performing a mathematical operation on the digitized oscillating signal.

19. The method of claim 18, further comprising determining the value of the environmental factor by determining a parameter selected from a list consisting of: 1) the frequency of the signal, and 2) pulse width determination of the signal.

20. An article comprising
a tangible machine-readable medium that contains instructions, which when executed by one or more processors result in performing operations comprising:
receiving a wireless response from a radio frequency identification (RFID) tag, the response including a first section modulated with an identification code of the RFID tag and a second section modulated with an oscillating signal whose frequency indicates a value of an environmental factor.

21. The article of claim 20, wherein the operations further comprise digitizing a demodulated version of the oscillating signal and performing a mathematical operation on the digitized signal to derive the frequency.

22. The article of claim 21, wherein the operation of performing a mathematical operation comprises performing a Fourier Transform.

23. The article of claim 20, wherein the operations further comprise converting the derived frequency to the value of the environmental factor.

* * * * *